United States Patent
Zhu et al.

(10) Patent No.: US 9,319,965 B2
(45) Date of Patent: Apr. 19, 2016

(54) APPARATUSES AND METHODS FOR CSI-RS CONFIGURATION IN DISTRIBUTED RRH SYSTEMS

(75) Inventors: Yuan Zhu, Beijing (CN); Alexei Vladimirovich Davydov, Nizhny Novgorod (RU); Rongzhen Yang, Shanghai (CN); Kamran Etemad, Potomac, MD (US); Xiangying Yang, Portland, OR (US); Jong-Kae Fwu, Santa Clara, CA (US); Yang-Seok Choi, Portland, OR (US); Yujian Zhang, Beijing (CN); Qinghua Li, San Ramon, CA (US); Xinrong Wang, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 138 days.

(21) Appl. No.: 13/990,693

(22) PCT Filed: Dec. 16, 2011

(86) PCT No.: PCT/US2011/065440
§ 371 (c)(1),
(2), (4) Date: Aug. 20, 2013

(87) PCT Pub. No.: WO2012/134565
PCT Pub. Date: Oct. 4, 2012

(65) Prior Publication Data
US 2014/0064201 A1    Mar. 6, 2014

Related U.S. Application Data

(60) Provisional application No. 61/471,042, filed on Apr. 1, 2011.

(51) Int. Cl.
*H04W 72/04* (2009.01)
*H04W 48/10* (2009.01)
(Continued)

(52) U.S. Cl.
CPC .............. *H04W 48/10* (2013.01); *H04B 7/0456* (2013.01); *H04L 5/003* (2013.01); *H04L 5/005* (2013.01);
(Continued)

(58) Field of Classification Search
CPC ................... H04W 72/0413; H04W 72/0486; H04W 24/10; H04W 72/1231; H04W 52/146; H04L 25/0224; H04L 25/0226; H04L 25/0391; H04L 5/0035; H04L 5/006; H04B 7/024; H04B 7/0632
See application file for complete search history.

(56) References Cited

U.S. PATENT DOCUMENTS 8,995,293 B2 * 3/2015 Jongren ................ H04W 24/10 370/252
2010/0085917 A1 4/2010 Gorokhov et al.
(Continued)

FOREIGN PATENT DOCUMENTS

CN    103583005 A    2/2014
WO    WO-2012134565 A1    10/2012

OTHER PUBLICATIONS

"CoMP with lower Tx power RRH in heterogeneous network", 3GPP TSG-RAN WG1 #64, R1-110867, No Image Available, (Feb. 25, 2011), Section 3.2.
(Continued)

*Primary Examiner* — Hoang-Chuong Vu
(74) *Attorney, Agent, or Firm* — Schwegman Lundberg & Woessner, P.A.

(57) ABSTRACT

Apparatuses and methods for channel state information reference signal (CSI-RS) configuration in distributed remote radio head (RRH) systems are described. A transmission point selection module can receive a user equipment (UE) signal via a transmission point from a plurality of transmission points sharing a single cell identification. A downlink transmission point can be selected based on the UE signal. The UE can then be configured to report CSI-RS measurements for the selected downlink transmission point.

23 Claims, 7 Drawing Sheets

(51) Int. Cl.

| | | |
|---|---|---|
| *H04B 7/04* | (2006.01) | |
| *H04L 5/00* | (2006.01) | |
| *H04L 12/26* | (2006.01) | |
| *H04L 12/721* | (2013.01) | |
| *H04L 29/06* | (2006.01) | |
| *H04W 4/00* | (2009.01) | |
| *H04W 24/00* | (2009.01) | |
| *H04W 24/02* | (2009.01) | |
| *H04W 24/10* | (2009.01) | |
| *H04W 28/08* | (2009.01) | |
| *H04W 48/12* | (2009.01) | |
| *H04W 52/02* | (2009.01) | |
| *H04W 52/14* | (2009.01) | |
| *H04W 52/18* | (2009.01) | |
| *H04L 25/02* | (2006.01) | |
| *H04L 25/03* | (2006.01) | |
| *H04W 28/04* | (2009.01) | |
| *H04W 72/00* | (2009.01) | |
| *H04W 88/02* | (2009.01) | |
| *H04W 88/08* | (2009.01) | |
| *H04W 92/20* | (2009.01) | |
| *H04B 7/02* | (2006.01) | |

(52) U.S. Cl.
CPC ............ *H04L 5/0037* (2013.01); *H04L 5/0057* (2013.01); *H04L 5/0094* (2013.01); *H04L 25/0224* (2013.01); *H04L 43/50* (2013.01); *H04L 45/70* (2013.01); *H04L 65/608* (2013.01); *H04W 4/005* (2013.01); *H04W 24/00* (2013.01); *H04W 24/02* (2013.01); *H04W 24/10* (2013.01); *H04W 28/08* (2013.01); *H04W 48/12* (2013.01); *H04W 52/0216* (2013.01); *H04W 52/146* (2013.01); *H04W 52/18* (2013.01); *H04W 72/042* (2013.01); *H04W 72/0413* (2013.01); *H04W 72/0453* (2013.01); *H04B 7/022* (2013.01); *H04B 7/0417* (2013.01); *H04L 5/0035* (2013.01); *H04L 5/0051* (2013.01); *H04L 2025/03426* (2013.01); *H04L 2025/03802* (2013.01); *H04W 28/048* (2013.01); *H04W 72/00* (2013.01); *H04W 88/02* (2013.01); *H04W 88/08* (2013.01); *H04W 92/20* (2013.01)

(56) References Cited

U.S. PATENT DOCUMENTS

| | | | | |
|---|---|---|---|---|
| 2010/0113105 | A1* | 5/2010 | Xu et al. | 455/572 |
| 2010/0317355 | A1 | 12/2010 | Zangi et al. | |
| 2011/0170435 | A1* | 7/2011 | Kim et al. | 370/252 |
| 2011/0199986 | A1* | 8/2011 | Fong | H04L 5/0035 370/329 |
| 2012/0236741 | A1* | 9/2012 | Xu et al. | 370/252 |
| 2013/0003788 | A1* | 1/2013 | Marinier | H04B 7/024 375/219 |
| 2013/0028109 | A1* | 1/2013 | Jongren et al. | 370/252 |
| 2013/0028182 | A1* | 1/2013 | Geirhofer | H04L 5/0048 370/328 |
| 2013/0039203 | A1* | 2/2013 | Fong | H04B 7/024 370/252 |
| 2013/0051240 | A1* | 2/2013 | Bhattad et al. | 370/241 |
| 2013/0088995 | A1* | 4/2013 | Chun et al. | 370/252 |
| 2013/0128832 | A1* | 5/2013 | Kang et al. | 370/329 |
| 2013/0208677 | A1* | 8/2013 | Lee | H04L 5/0094 370/329 |
| 2013/0250913 | A1* | 9/2013 | Geirhofer et al. | 370/331 |
| 2013/0315197 | A1* | 11/2013 | Park | H04W 72/042 370/329 |

OTHER PUBLICATIONS

"Further details of CoMP Scenarios for evaluation, especially Scenario 4", 3GPP TSG RAN WG1 Meeting #64,R1-110802, No Image Available, (Feb. 25, 2011), Section 2.2.
"Further details on CoMP configurations", 3GPP TSG RAN WG1, Meeting #64, R1-110936, No Image Available, (Feb. 25, 2011), Section 2.
"International Application Serial No. PCT/US2011/065440, Search Report mailed May 31, 2012", 3 pgs.
"International Application Serial No. PCT/US2011/065440, Written Opinion mailed May 31, 2012", 5 pgs.
"International Application Serial No. PCT/US2011/065440, International Preliminary Report on Patentability mailed Oct. 10, 2013", 7 pgs.
"Chinese Application Serial No. 201180071237.3, Office Action mailed Sep. 1, 2015", W/ English Translation, 8 pgs.
"Clarifications and Design Requiremens for CoMP Scenarios 1-3", R1-110973, 3rd Generation Partnership Project, (Feb. 15, 2011).
"Discussion on Intra-cell CoMP Operation", R1-110744, 3rd Generation Partnership Project, (Feb. 15, 2011).
"European Application Serial No. 11862561.5, Extended European Search Report mailed Aug. 20, 2014", 10 pgs.
"Further consideration for CoMP scenarios", R1-110814, 3rd Generation Partnership Project, (Feb. 17, 2011).
Ericsson, et al., "Aspects on Distributed RRUs with Shared Cell-ID for Heterogeneous Deployments", R1-110649_Shared_Cell_ID, (Feb. 17, 2011).
Ericsson, et al., "Baseline Schemes and Focus of CoMP Studies", R1-110461_Comp_High_Level, 3rd Generation Partnership Project, (Jan. 12, 2011).
ETRI, "Discussion on further details of Scenario 4", 3rd Generation Partnership Project, (Feb. 15, 2011).

\* cited by examiner

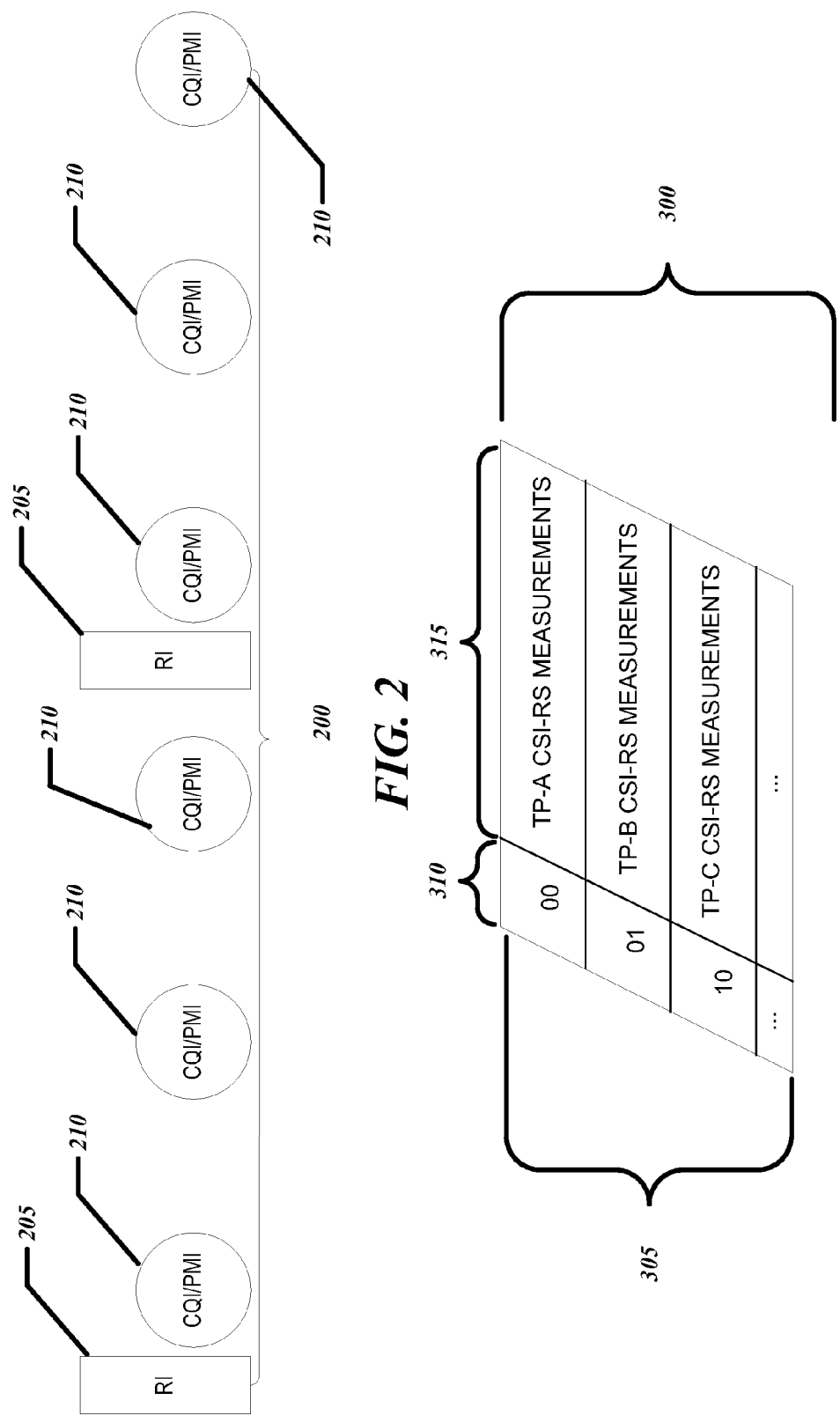

APPARATUSES AND METHODS FOR CSI-RS CONFIGURATION IN DISTRIBUTED RRH SYSTEMS

CLAIM OF PRIORITY

This patent application is a U.S. National Stage Filing under 35 U.S.C. 371 from International Patent Application Serial No. PCT/US2011/065440, filed Dec. 16, 2011, published on Oct. 4, 2012 as WO/2012/134565 A1, which claims the benefit of priority to U.S. Provisional Patent Application Ser. No. 61/471,042, filed on Apr. 1, 2011, all of which are incorporated herein by reference in their entirety.

BACKGROUND

In wireless networks in which user equipment (e.g., a mobile phone, computer, or other wireless device), also known as UE, moves relative to transmission points (e.g., antennas, transceivers, etc.) of the wireless network, determining which transmission points will serve the user equipment is a concern for the wireless network operators. Cellular networks often organize transmission points into cells to serve the user equipment. Often, each cell is identifiable by a cell identification (ID) and transmission point performance metrics (e.g., radio signal strength, signal to noise ratio, etc.) are measured at the user equipment and reported, based on the cell ID, to the wireless network.

Coordinated multi-point (CoMP) remote radio head (RRH) (e.g., Macro+RRH scenario three) techniques logically combine different transmission points that work cooperatively to service the user equipment. Often these transmission points maintain cell IDs distinct from each other allowing user equipment reporting to remain unchanged from more traditional cellular networks.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 2 illustrates an example CSI-RS reporting period, according to one embodiment.

FIG. 3 illustrates an example CSI-RS index 300, according to one embodiment.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

CoMP scenario four Macro+RRH is a wireless network where the transmission points share a single cell ID. That is, to the user equipment, service from a single cell as opposed to multiple cells in a traditional, or CoMP scenario three Macro+RRH wireless network. For convenience, the 3GPP Long Term Evolution Advanced (LTE-A) (e.g., 3GPP Long Term Evolution release 10, 3GPP standard 36.21X vb.x.x, release 11 and beyond) family of standards are used as an example wireless network for the discussion below. However, the present subject matter is not so limited and applicable to other wireless (e.g., cellular) networks using multiple transmission points sharing the same cell ID.

Because transmission points in the CoMP scenario four Macro+RRH wireless network share a cell ID, traditional user equipment reporting mechanisms may not be effective in providing the wireless network the information to best serve the user equipment. That is, identifying transmission points to best serve the user equipment can be difficult when they appear as a single cell to the user equipment. This problem can be more complex in identifying downlink transmission points (e.g., transmission points to transmit data specifically to the user equipment).

To identify appropriate downlink transmission points the wireless network can employ alternative mechanisms to evaluate the channel metrics between the transmission points and the user equipment. For example, channel state information (CSI) between the transmission points and the user equipment can be used, although the ability of the user equipment to process and report CSI for all available transmission points can be limited.

Configuring (e.g., reconfiguring) the user equipment to report CSI for transmission points appropriate to be downlink transmission points can allow the user equipment to provide channel quality information that the wireless network can use to select a downlink transmission point. For example, a wireless infrastructure component (e.g., eNB or enhanced node B) of the wireless network can receive a user equipment signal via one or more of the transmission points. The signal can be used as a basis to select one or more appropriate downlink transmission points. The wireless infrastructure component can then configure the user equipment to report measurements on the CSI reference signal (CSI-RS) for the selected downlink transmission points. These measurements can be used to optimize downlink transmissions to the user equipment.

Figure 1:
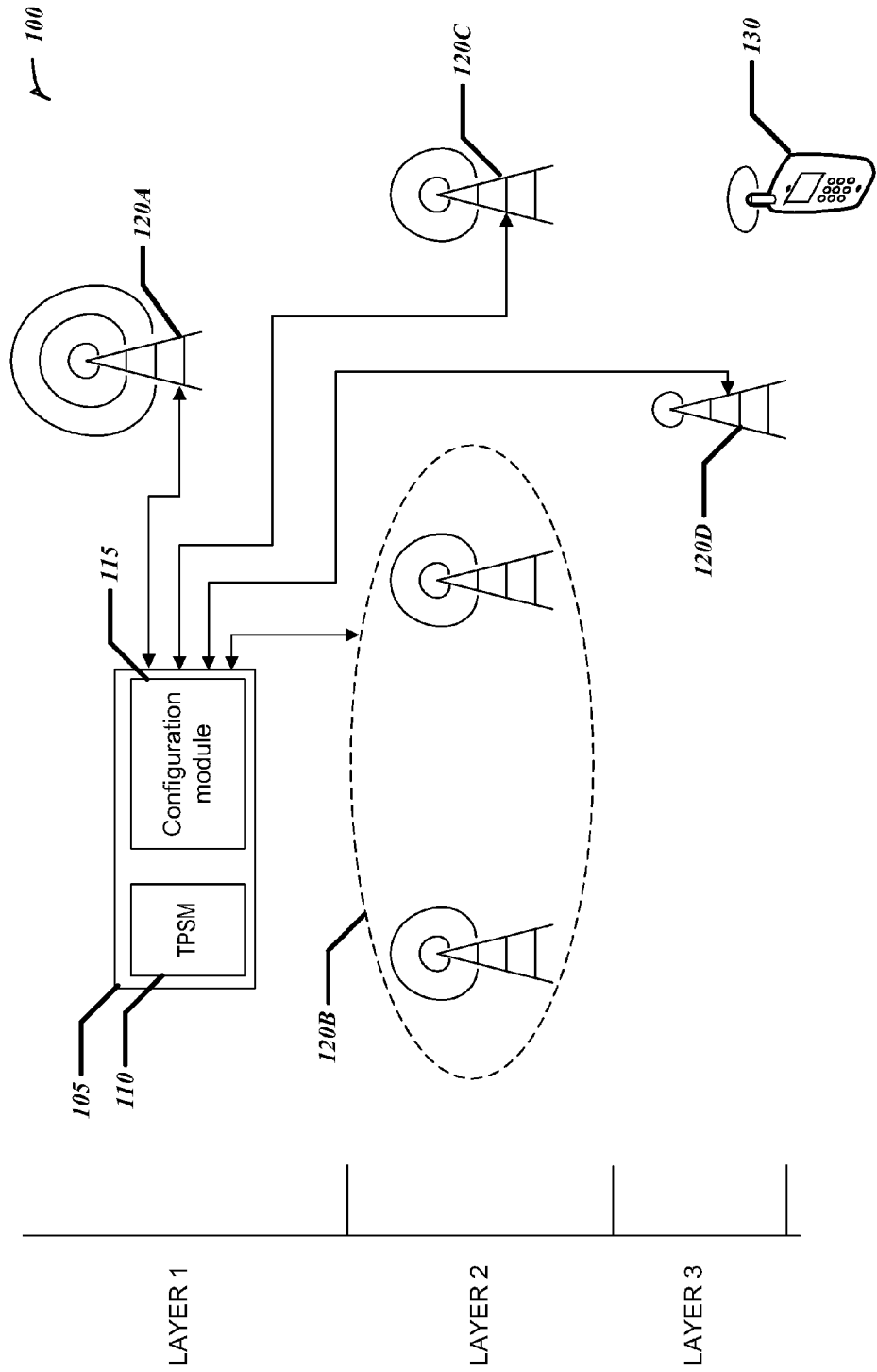
FIG. 1 illustrates an example CoMP scenario four Macro+RRH system including a wireless infrastructure component for CSI-RS configuration, according to one embodiment.

FIG. 1 illustrates an example CoMP scenario four Macro+RRH system 100. System 100 includes wireless infrastructure component 105 to perform CSI-RS configuration of the user equipment 130 communicatively coupled (e.g., via one or more wired or wireless networks) to transmission points 120A-D sharing a single cell ID.

In an example, each of the transmission points 120A-D can uniquely correspond to a CSI-RS pattern (e.g., via a mapping by the transmission point selection module 110). In an example, the transmission points 120A-D each have at least one radio transceiver (e.g., a transmitter, receiver, or both) and are configured to communicate with the user equipment 130 via its transceivers. In an example, at least one of the transmission points 120A-D (e.g., transmission point 120B) has a plurality of antennas.

In an example, the antennas of transmission point 120B can be located at a single geographical location, or in more than one geographical location (e.g., separated by a nontrivial physical distance such as on different floors of a building). In an example, when the antennas of transmission point 120B are in different geographical locations, each can be attached to different housings or transceivers. In an example, transmission point 120B can be configured to communicate with the user equipment 130 using a multiple-input multiple-output (MIMO) radio channel. In an example, the MIMO channel can comprise up to eight spatial streams. In an example, the multi-antenna transmission capability of transmission point 120B can be used for multi-user MIMO and beamforming. In an example, a CSI-RS pattern can be mapped, for example by the transmission point selection module 110, a subset of the transmission point's 120B antennas (one or more antennas, less than the total number of transmission point's 120B antennas, can be mapped to a unique CSI-RS).

In an example, each of the plurality of transmission points 120A-D can correspond to one of a plurality of layers. For example, transmission point 120A corresponds to layer 1, transmission points 120B-C correspond to layer 2, and 120$dx$ corresponds to layer 3 as illustrated in FIG. 1. In an example, each of the plurality of layers can correspond to a transmission range. The transmission range is a desired range sought via various transmission point design dimensions, including one or more of antenna placement (e.g., height, position with respect to surrounding terrain or structures, etc.) transmit power, etc. Example layers can include macrocells, microcells, picocells, and femtocells among others. As illustrated in FIG. 1, lower numbered layers have greater transmission ranges (e.g., layer 1 can be a macrocell and layer 3 can be a femtocell). In an example, lower number layers can be considered closer to an edge of the wireless network than higher-level layers.

The wireless infrastructure component 105 can include a transmission point selection module 110 and a configuration module 115, one or both communicatively coupled to the transmission points 120A-D. In an example, the transmission point selection module 110 can be configured (e.g., include the necessary hardware and software) to receive, from the user equipment 130, a UE signal via one or more of transmission points 120A-D. The transmission point selection module 110 can also be configured to select a downlink transmission point from the transmission points 120A-D based on the UE signal.

The configuration module 115 can be communicatively coupled to the transmission point selection module 110 and configured to communicate instructions to the user equipment 130. The instructions can be configured to cause the user equipment 130 to report CSI-RS measurements for the selected downlink transmission point. Thus, the configuration module 115 can effectuate CSI-RS configuration of the user equipment 130. In an example, the configuration module 115 can use LTE-A's remote resource control (RRC) protocol to configure the user equipment 130. In an example, the configuration module 115 can also configure one or more transmission points 120A-D to assign a CSI-RS pattern to a transmission point in transmission points 120A-D.

In an example, the UE signal can be an uplink signal. An uplink signal can be a broadcast or data segment that is part of the wireless network's protocol communicate from the user equipment 130, including measuring the quality of the uplink channel. In an example, the uplink signal relates to the uplink channel and does not include other informational data transmitted from the user equipment 130 to the wireless network. In an example, the uplink signal can be a sounding reference signal (SRS). In an example, the SRS can transmitted, by the user equipment 130 (e.g., the user equipment 130 is configured to transmit) at a higher power than SRS transmission power to accomplish physical uplink shared channel (PUSCH) link adaption. In an example, a different (e.g., higher) SRS transmission power can be specified in one or more SRS parameter sets communicated to the user equipment 130 via RRC signaling. In an example, the eNB can specify a different SRS transmission power (e.g., via a specific parameter set) to the user equipment 130 using downlink control signaling.

In an example, when the UE signal is an uplink signal, transmission point selection module 110 can be configured to measure the uplink signal at each receiving transmission point to create uplink signal measurements, rank the receiving transmission points based on the measured uplink signal measurements, and select the downlink transmission point based on the ranking (e.g., selecting a transmission point with the most favorable ranking). For example, the transmission point selection module 110 can measure the receiving power of SRS from multiple transmission points 120 and use the receiving power to estimate the absolute pathloss from multiple transmission points 120 to the user equipment 130. In an example, the rank can be further based on a transmission metric (e.g., transmission power or range, physical location, logical network location, etc.) of the transmission points 120A-D. In an example, the following can be used by the transmission point selection module 110 to select the best transmission point based on the SRS measurements and a transmission point transmission metric:

$$DLTP_0 = x | \max\{TxPower(x) + RxPowerSRS(x): x \in TP\}: \qquad \text{EQ1}$$

In Equation 1, TP is the set of receiving transmission points, TxPower and RxPowerSRS are respectively the transmission power and SRS received power of a transmission point 120, and $DLTP_0$ is the optimal downlink transmission point. Thus, in this example, the SRS received power and the transmission point transmission power are a ranking bases.

In the previous example, large power difference between transmission points can result, for example, in a more distantly placed macrocell being selected (due to its powerful transmitter) with a weak SRS measurement over a picocell with a much stronger SRS measurement. The wireless network operators may wish to avoid this situation (e.g., over-selection of transmission points with greater transmission range) to achieve various purposes (e.g., load balancing, redundancy, etc.). A selection threshold can be defined and the transmission point selection module 110 can be configured to select a transmission point other than $DLTP_0$ as the downlink transmission point to meet the wireless network operator's purposes described above. Using $TPDL_0$ from Equation 1, any transmission point 120, y in TP, can be selected if it is within the selection threshold. In an example, the following can provide the set of selectable transmission points:

$$Y|\{TxPower(TPDL_0) + RxPowerSRS(TPDL_0) - TxPower(y) + + RxPowerSRS(y) < ST: y \in TP, y \neq TPDL_0\}: \qquad \text{EQ2}$$

In Equation 2, ST is the selection threshold (e.g., 3 dB), Y is the set of selectable transmission points, and all other terms are the same as in Equation 1.

In an example, in addition to or in place of an uplink signal, the UE signal can include a CSI-RS index (UESCI). In an example, the UESCI can be configured to carry the CSI-RS index so as to be reliable. In an example, the reliability is greater than at least one of channel quality indications (CQI) (e.g., channel quality indicators or reports thereof), precoding matrix information (PMI), and MIMO rank index (RI). In an example, the UESCI is configured to be fast enough to take advantage of one or more transmission or reporting attributes, such as enjoying a signal to noise (SINR) gain from fast fading of multiple transmission points. In an example, the UESCI can be, in whole or part, asynchronous. In an example, the UESCI can be configured to minimize impact on other user equipment 130 signaling (e.g., CQI reports). In an example, the UESCI can be configured to carry the CSI-RS index in the eleventh quadrature phase shift keying (QPSK) symbol of the 2b the physical uplink control channel (PUCCH) format. In an example, the UESCI can be configured to send the CSI-RS index together with the RI report. In an example, the wireless infrastructure component 105 (e.g., the configuration module 115) can configure the user equipment 130 to report the CSI-RS index in one or any combination of the UESCI configurations detailed above. In an example, the wireless infrastructure component 105 can configure the period in which the user equipment 130 will report the CSI-RS index.

FIG. 2 illustrates an example CSI-RS reporting period 200. The reporting period can be set with respect to time or, as illustrated, with respect to other user equipment 130 signaling, such as RI reports 205 and CQI/PMI reports 210. In an example, CQI is reported by the user equipment 130 for the user equipment's 130 current downlink transmission point only.

FIG. 3 illustrates an example CSI-RS index 300. The CSI-RS index 300 can include one or more slots 305 each corresponding to a single CSI-RS pattern (represented by CSI-RS pattern index 310) and including CSI-RS based measurements 315 derived (e.g., by the user equipment 130) from the single CSI-RS pattern. In an example, the transmission point selection module 110 can be configured to select the downlink transmission point based on the CSI-RS index 300.

In an example, the CSI-RS index 300 can include fewer slots 305 than observable transmission points observable by the user equipment 130. In this case, the transmission point selection module 110 can be configured to select likely transmission points based on the selected downlink transmission point (e.g., by associating transmission points to the downlink transmission point via geographical affinity, or other metric). The transmission point selection module 110 can then remap one or more slots 305 to CSI-RS patterns corresponding to the likely transmission points. In an example, when the eleventh QPSK symbol of PUCCH format 2b is used to carry the CSI-RS index 300, CSI-RS index 300 is limited to four slots 305.

In an example, the CSI-RS pattern index 310 can be the CSI-RS pattern. In an example, the CSI-RS pattern index 310 can be an abstract key associated to the CSI-RS pattern by the wireless infrastructure component 105 (e.g., by the configuration module 115) on both the wireless infrastructure component 105 and the user equipment 130. In an example, the wireless infrastructure component 105 (e.g., the configuration module 115) can reconfigure the user equipment 130 or CSI-RS pattern mapping to CSI-RS pattern index 310 as the wireless network environment changes to facilitate, for example, CSI-RS reporting on the most salient transmission points when the CSI-RS index 300 does not have enough room to report on all user equipment 130 observable transmission points. In an example, the configuration module 115 can be configured to map CSI-RS patterns to slots 305 according to a sequence. In an example, the CSI-RS index 300 can include only one slot 305 to which the sequence is mapped, allowing the omission of the CSI-RS pattern index 310. The following single slot sequence is an example: $\{CSI\text{-}RS_{TP\text{-}A}, CSI\text{-}RS_{TP\text{-}B}, CSI\text{-}RS_{TP\text{-}B}, CSI\text{-}RS_{TP\text{-}C}\}$ where $CSI\text{-}RS_{TP\text{-}A}$, $CSI\text{-}RS_{TP\text{-}B}$, and $CSI\text{-}RS_{TP\text{-}C}$ are the CSI-RS patterns respectively assigned to transmission points A-C. In this example, the user equipment 130 will report each of the $CSI\text{-}RS_{TP\text{-}A}$ and $CSI\text{-}RS_{TP\text{-}C}$ patterns (or measurements derived thereof) 25% of the time and $CSI\text{-}RS_{TP\text{-}B}$ the remaining 50% of the time. In an example, the sequence can advance (i.e., the next CSI-RS pattern is mapped to a given slot 305) after a predetermined period (e.g., after a time period has elapsed, after an event signals the end of the period such as a particular signal is transmitted by the user equipment 130 or RI reporting cycle, etc.). It will be understood that the wireless infrastructure component 105 can correlate the reported CSI-RS pattern based measurements by virtue of knowing the sequence used by the user equipment 130. In an example, both a sequence and a non-sequenced CSI-RS index 300 can be used together.

In an example, the CSI-RS based measurements 315 can include reference signal received power and reference signal received quality (RSRP/RSRQ) measurements relative to the user equipment 130 (e.g., as observed or determined at the user equipment 130). In an example, where the CSI-RS based measurements 315 include RSRP/RSRQ measurements, to select the downlink transmission point, the transmission point selection module 110 can be configured to rank the transmission points based on the RSRP/RSRQ measurements and select the downlink transmission point based on the ranking. In an example, selecting the downlink transmission point based on the ranking includes selecting a more favorably ranked transmission point 120. In an example, higher observed or computed RSRP/RSRQ results in a more favorable ranking.

In an example, to prevent unproductive successive CSI-RS reconfigurations between two transmission points when the user equipment 130 is, for example, on the border between those two transmission points, the transmission point selection module 110 can be configured to favorably weight the rank (e.g., include a modifier resulting in a more favorable ranking) of the user equipment's 130 current downlink transmission point based on a transition threshold. In an example, the transition threshold is a received power level. In this example, the downlink transmission point will not change from the current downlink transmission point to a new downlink transmission point until the signal power level of the new downlink transmission point is the value of the threshold point greater. In an example, other transmission metrics of the transmission points can be used, the transition threshold being a value representing a difference between the transmission metrics beyond which CSI-RS reconfiguration will be unlikely to bounce between the two transmission points (e.g., the user equipment 130 has sufficiently moved into the new downlink transmission point's zone).

In an example, the UE signal can include a CQI corresponding to a CSI-RS pattern selected by the user equipment 130 to maximize a communication performance metric. In an example, the CQI can be in a CSI-RS index 300 slot 305. In an example, the CQI can be outside the CSI-RS index 300 and correlated to the CSI-RS pattern via the CSI-RS index 300

(e.g., via CSI-RS pattern index 310). In an example the performance metric is at least one of data throughput and SINR gain. In an example, where the user equipment 130 selects a CSI-RS pattern to report CQI for (e.g., in which the user equipment 130 selects its desired downlink transmission point), the transmission point selection module 110 can be configured to select the downlink transmission point by selecting a transmission point corresponding to the CQI. This is known as fast CSI-RS reconfiguration or selection.

In an example, where fast CSI-RS reconfiguration is employed, the transmission point selection module 110 can be configured to configure the user equipment 130 to bias CSI-RS pattern selection based on the layers (network transmission point layers discussed above, such as macrocell, etc.) corresponding to the CSI-RS pattern's transmission points. In an example, the bias can be configured to direct the user equipment's 130 autonomous transmission point selection behavior to prefer transmission points at particular layers to, for example load balance among the layers. This is known as CSI-RS range expansion.

Figure 4:
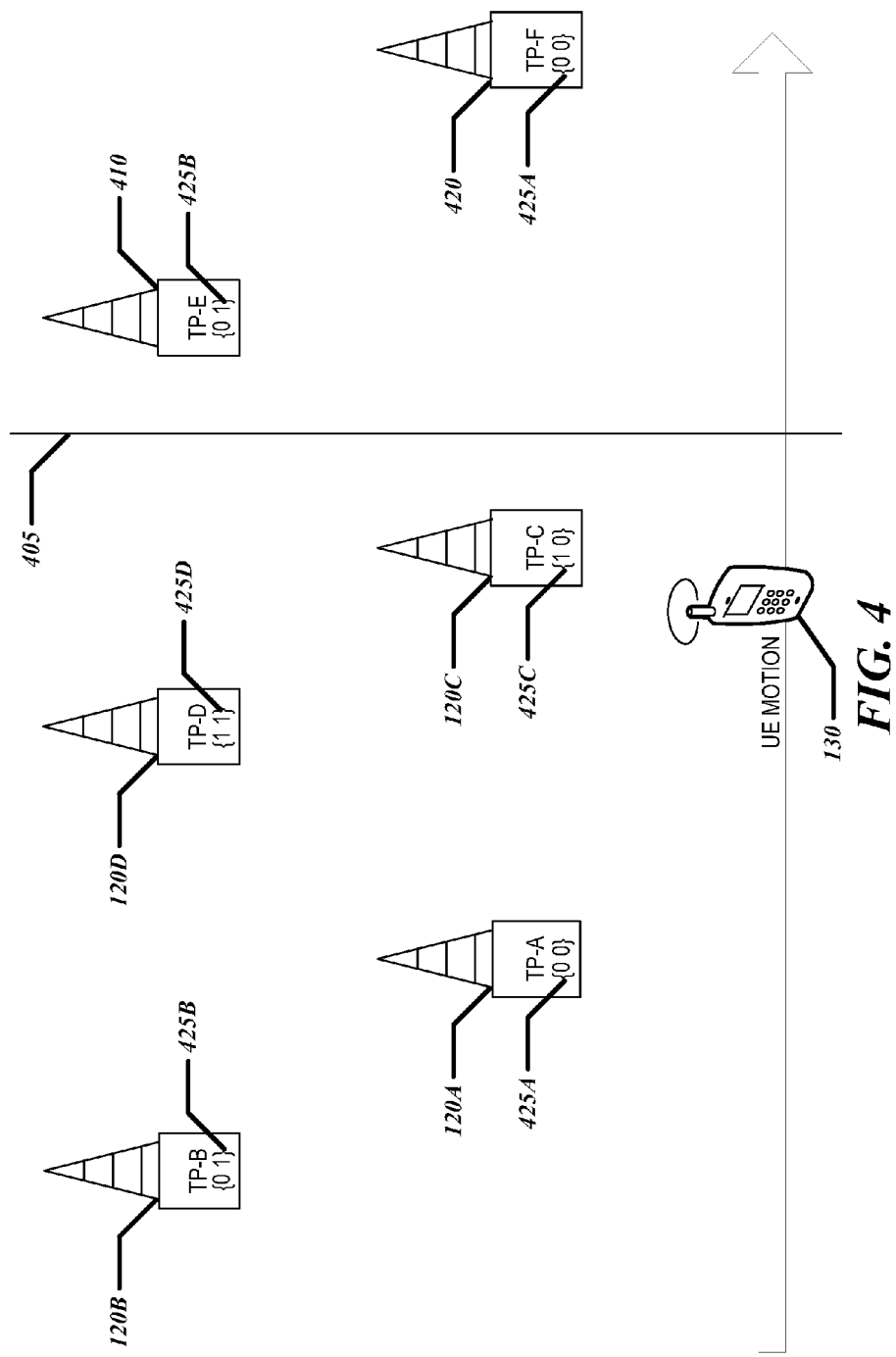
FIG. 4 illustrates CSI-RS pattern index remapping as user equipment moves in relation to transmission points, according to one embodiment.

FIG. 4 illustrates CSI-RS pattern index 310 mapping (e.g., remapping) as the user equipment 130 moves in relation to the transmission points 120A-D and transmission points 425E-F. Inflection point 405 indicates a condition of the user equipment 130 movement (e.g., a physical point, or change environment affecting radio communications) on which the wireless infrastructure component 105 (e.g., transmission point selection module 110 or configuration module 115) can base a decision to remap the CSI-RS pattern index 310. For example, as illustrated in FIG. 4, the CSI-RS pattern index 310 is mapped such that CSI-RS pattern indices 425A-B are respectively mapped to CSI-RS patterns corresponding to transmission points 120A-D. After the user equipment 130 reaches, or passes, the inflection point 405, the CSI-RS pattern index 310 is remapped such that CSI-RS index 425A is now mapped to the CSI-RS pattern corresponding to transmission point E 410 and CSI-RS index 425B is now mapped to the CSI-RS pattern corresponding to transmission point F 420.

Figure 5:
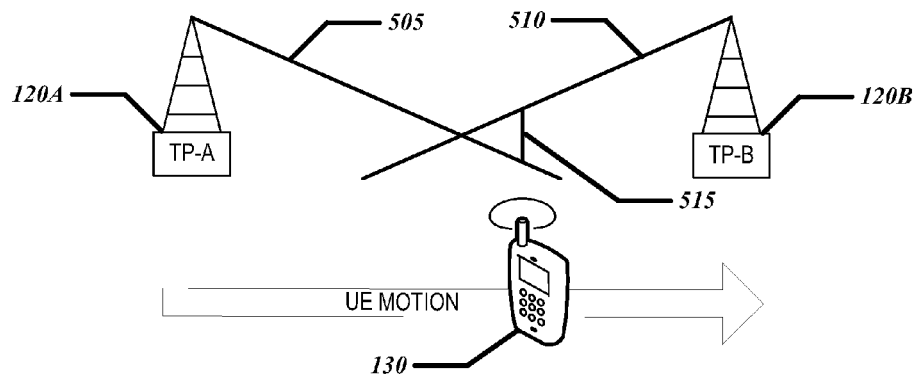
FIG. 5 illustrates operation of a transition threshold as the user equipment 130 moves in relation to transmission points, according to one embodiment.

FIG. 5 illustrates the transition threshold operation as the user equipment 130 moves in relation to the transmission points 120A-B. Line 505 is a representation of the transmission point's 120A power as perceived at the user equipment 130, with the y-axis representing power and the x-axis representing position. Similarly, line 510 represents transmission points 120B power as perceived at the user equipment 130. The length of line 515 represents the transition threshold value and the line 515's position marks the user equipment's 130 at which, or beyond to the right, the transmission point selection module 110 is configured to reconfigure the CSI-RS signaling of the user equipment 130. Thus, to maximize user equipment 130 performance, the transition threshold can be configured to be as small as possible and still avoid successive CSI-RS reconfigurations that are likely to occur (e.g., because of signal power fluctuations) at the border between the respective ranges of transmission points 120A-B (represented by the intersection of lines 505-510).

Figure 6:
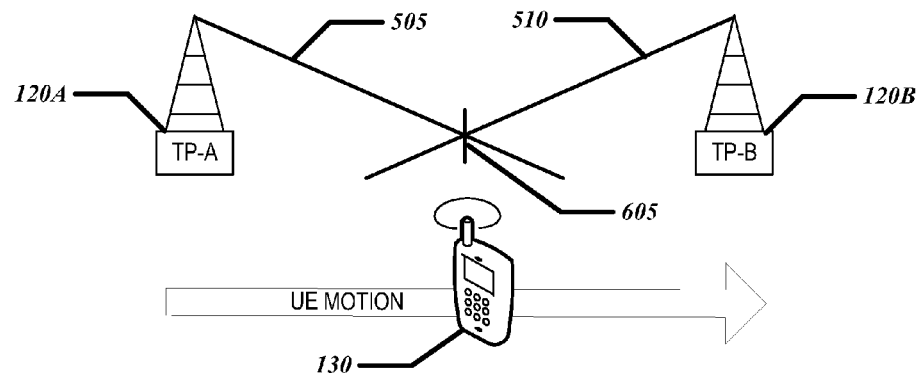
FIG. 6 illustrates fast CSI-RS selection, according to one embodiment.

FIG. 6 illustrates fast CSI-RS selection, in contrast to the CSI-RS reconfiguration shown in FIG. 5, as the user equipment 130 moves in relation to the transmission points 120A-B. Here, because the user equipment 130 selects the best transmission point between transmission points 120A-B, a new downlink transmission point can be selected as near the border 605. This can result in better overall performance as the user equipment 130 will not experience the signal quality penalty introduced by the transition threshold.

One or more operations of the method described below can be performed by one or more components (e.g., wireless infrastructure component 105, transmission point selection module 110, configuration module 115, transmission points 120A-D, and user equipment 130) alone, or in any combination. It will be understood, however, that the present subject matter is not so limited and combinations including components not here described can also be used to perform the operations described below.

Figure 7:
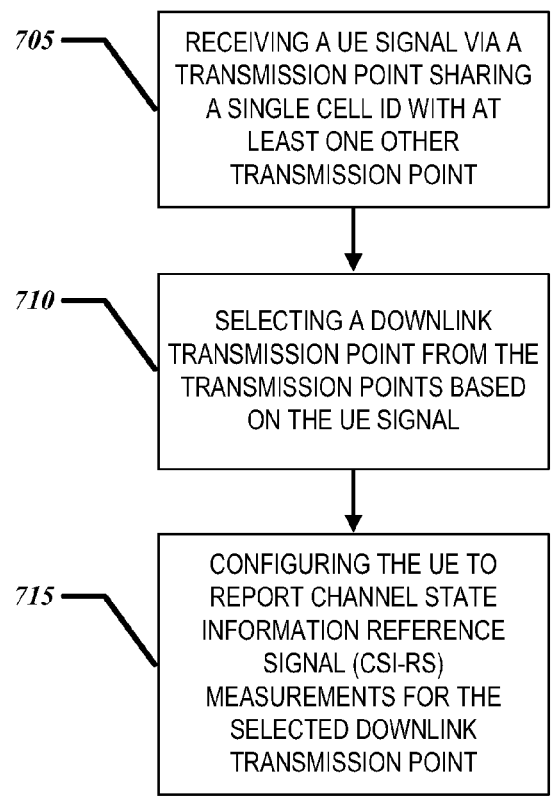
FIG. 7 is a flowchart illustrating an example method for CSI-RS configuration in distributed RRH systems, according to one embodiment.

FIG. 7 is a flowchart illustrating an example method 700 for CSI-RS configuration (e.g., reconfiguration) in distributed RRH (e.g., LTE-A CoMP scenario four Macro+RRH) systems. In an example, the operations of method 700 can be performed in whole or in part by transmission point selection module 110.

At operation 705 the wireless infrastructure component 105 (e.g., transmission point selection module 110) can receive a UE signal from user equipment 130 via one or more transmission points (e.g., receiving transmission points). The one or more transmission points are in a plurality of transmission points that share a single cell ID.

In an example, where the UE signal includes a CSI-RS index with one or more slots and each of the plurality of transmission points uniquely corresponds to a CSI-RS pattern, operation 705 can additionally include selecting the downlink transmission point based on the CSI-RS index.

In an example, where the CSI-RS index includes CSI-RS measurements, derived from CSI-RS patterns of the plurality of transmission points, including RSRP/RSRQ measurements relative to the user equipment 130, operation 705 can additionally include ranking the plurality of transmission points based on the RSRP/RSRQ measurements. Operation 705 can continue by selecting the downlink transmission point based on the ranking. The ranking of this example can additionally include favorably weighting the rank of a current downlink transmission point based on a transition threshold (e.g., as described above).

In an example, where the UE signal further includes a CQI (e.g., CQI report) corresponding to a CSI-RS pattern selected by the UE (e.g., fast CSI-RS selection) to maximize a communication performance metric (e.g., SINR or data throughput), operation 705 can additionally include selection a transmission point corresponding to the CSI-RS pattern corresponding to the CQI.

At operation 710 the wireless infrastructure component 105 can select a downlink transmission point the plurality of transmission points based on the UE signal. In an example, additional transmission points (e.g., likely transmission points) can be selected based on the selected downlink transmission point. For example, the likely transmission points can be associated with the selected downlink transmission point geographically (e.g., they are located with a certain distance) or via another metric (e.g., by wireless network design to achieve a purpose such as load balancing).

In an example, where the CSI-RS index includes CSI-RS measurements, derived from CSI-RS patterns of the plurality of transmission points operation 710 can additionally include mapping CSI-RS patterns to slots in the CSI-RS index.

In an example, given autonomous user equipment 130 CSI-RS pattern selection (e.g., fast CSI-RS selection) where each of the plurality of transmission points correspond to one of a plurality of layers differentiated by transmission ranges (e.g., macrocell, microcell, etc.), operation 710 can optionally include configuring the user equipment 130 to bias CSI-RS pattern selection (as described above) based on the layer corresponding to the CSI-RS pattern's transmission point 120.

In an example, where the CSI-RS index includes fewer slots than UE observable transmission points, operation 710 can additionally include mapping CSI-RS patterns to a slot of the CSI-RS index according to a sequence (e.g., as described above). In this example, operation 710 can also include configuring the user equipment 130 to advance the sequence after a predetermined period (e.g., as described above).

At operation 715 the wireless infrastructure component 105 (e.g., configuration module 115) can configure the user equipment 130 to report CSI-RS measurements for the selected downlink transmission point. In an example, the user equipment 130 can also be configured to report CSI-RS measurements for the likely transmission points.

Figure 8:
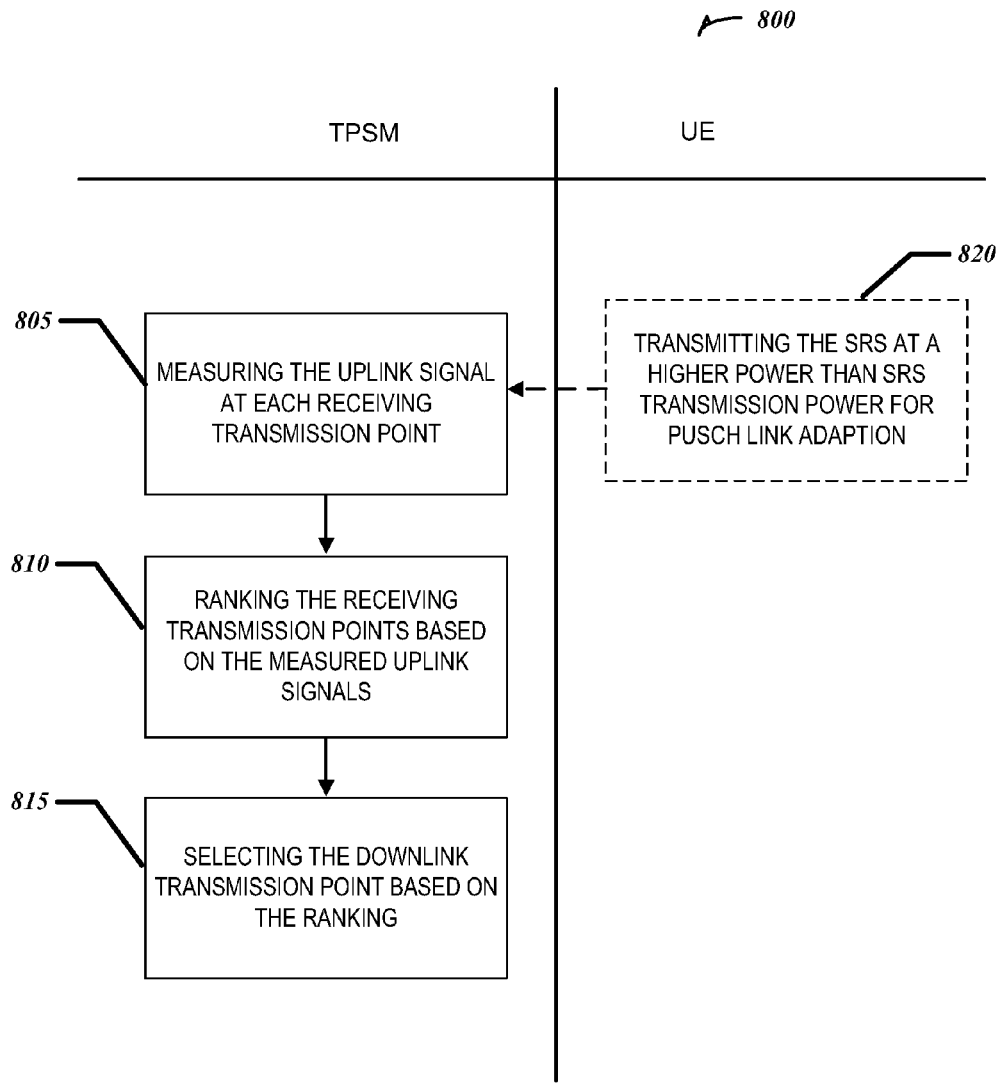
FIG. 8 is a flowchart illustrating an example method for selecting a downlink transmission point, according to one embodiment.

FIG. 8 is a flowchart illustrating an example method 800 for selecting a downlink transmission point. In an example, the operations 805-815 can be performed in whole or in part by transmission point selection module 110. In an example, operation 820 can be performed by the user equipment 130. Method 800 operates in the context of the UE signal being an uplink signal (as described above). In an example, the uplink signal is a SRS. In an example, the uplink signal is a demodulation reference signal (DMRS).

At operation 805 the uplink signal can be measured at each receiving transmission point.

At operation 810 the receiving transmission points can be ranked based on the measured uplink signals. In an example, the ranking can be further based on a transmission metric (as described above) of the transmission point.

At operation 815 the downlink transmission point can be selected based on the ranking.

At operation 820, where the uplink signal is a SRS, the SRS can be transmitted (e.g., by the user equipment 130) at a higher power than SRS transmission power for PUSCH link adaption.

Figure 9:
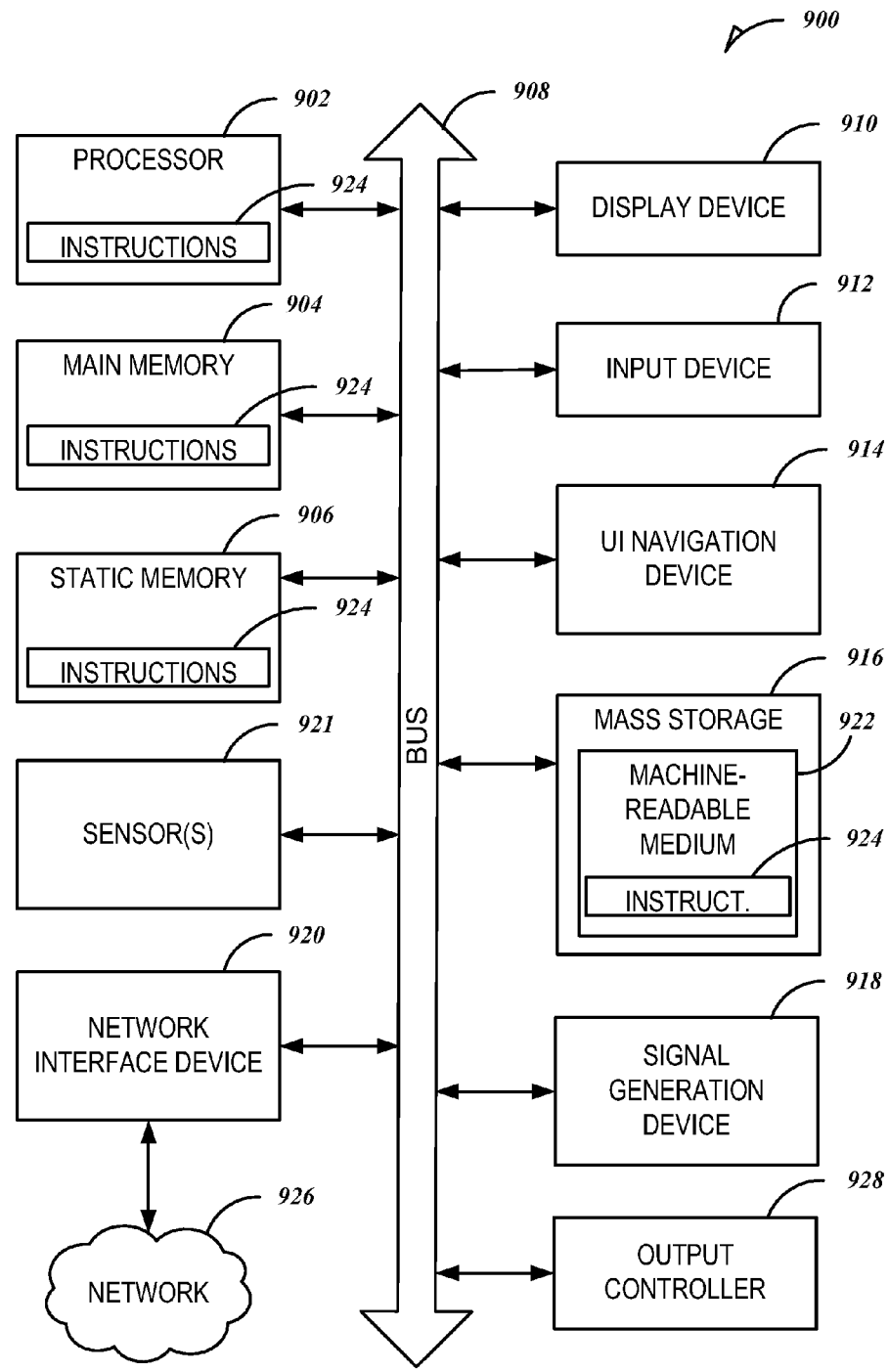
FIG. 9 illustrates a block diagram illustrating an example machine upon which one or more embodiments can be implemented.

FIG. 9 illustrates a block diagram of an example machine 900 upon which any one or more of the techniques (e.g., methodologies) discussed herein can perform. In alternative embodiments, the machine 900 can operate as a standalone device or can be connected (e.g., networked) to other machines. In a networked deployment, the machine 900 can operate in the capacity of a server machine, a client machine, or both in server-client network environments. In an example, the machine 900 can act as a peer machine in peer-to-peer (P2P) (or other distributed) network environment. The machine 900 can be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate on, logic or a number of components, modules, or mechanisms. Modules are tangible entities capable of performing specified operations and can be configured or arranged in a certain manner. In an example, circuits can be arranged (e.g., internally or with respect to external entities such as other circuits) in a specified manner as a module. In an example, the whole or part of one or more computer systems (e.g., a standalone, client or server computer system) or one or more hardware processors can be configured by firmware or software (e.g., instructions, an application portion, or an application) as a module that operates to perform specified operations. In an example, the software can reside (1) on a non-transitory machine-readable medium or (2) in a transmission signal. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor can be configured as respective different modules at different times. Software can accordingly configure a hardware processor, for example, to constitute a particular module at one instance of time and to constitute a different module at a different instance of time.

Machine (e.g., computer system) 900 can include a hardware processor 902 (e.g., a central processing unit (CPU), a graphics processing unit (GPU), a hardware processor core, or any combination thereof), a main memory 904 and a static memory 906, some or all of which can communicate with each other via a bus 908. The machine 900 can further include a display unit 910, an alphanumeric input device 912 (e.g., a keyboard), and a user interface (UI) navigation device 911 (e.g., a mouse). In an example, the display unit 910, input device 917 and UI navigation device 914 can be a touch screen display. The machine 900 can additionally include a storage device (e.g., drive unit) 916, a signal generation device 918 (e.g., a speaker), a network interface device 920, and one or more sensors 921, such as a global positioning system (GPS) sensor, compass, accelerometer, or other sensor. The machine 900 can include an output controller 928, such as a serial (e.g., universal serial bus (USB), parallel, or other wired or wireless (e.g., infrared (IR)) connection to communicate or control one or more peripheral devices (e.g., a printer, card reader, etc.).

The storage device 916 can include a machine-readable medium 922 on which is stored one or more sets of data structures or instructions 924 (e.g., software) embodying or utilized by any one or more of the techniques or functions described herein. The instructions 924 can also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 can constitute machine readable media.

While the machine-readable medium 922 is illustrated as a single medium, the term "machine readable medium" can include a single medium or multiple media (e.g., a centralized or distributed database, and/or associated caches and servers) that configured to store the one or more instructions 924.

The term "machine-readable medium" can include any tangible medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine-readable medium examples can include solid-state memories, and optical and magnetic media. Specific examples of machine-readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 can further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), peer-to-peer (P2P) networks, among others. In an example, the network interface device 920 can include one or more physical jacks (e.g., Ethernet, coaxial, or phone jacks) or one or more antennas to connect to the communications network 926. In an example, the network interface device 920 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software.

Additional Notes & Examples

Example 1 includes subject matter (such as a system, an apparatus, a device, etc.) comprising transmission points sharing a single cell identification (ID). Each transmission point comprises at least one radio transceiver. Example 1 further comprises a transmission point selection module (TPSM) communicatively coupled to the transmission points. The transmission point selection module is configured to receive, from a user equipment device (UE), a UE signal via one or more of the transmission points, and select a downlink transmission point from the transmission points based on the UE signal. Example 1 further comprises a configuration module communicatively coupled to the TPSM and configured to communicate instructions to the UE, the instructions configured to cause the UE to report channel state information reference signal (CSI-RS) measurements for the selected downlink transmission point.

In Example 2, the subject matter of Example 1 can optionally include wherein the UE signal is an uplink signal, and wherein to select the downlink transmission point based on the UE signal includes the TPSM further configured to measure the uplink signal at each receiving transmission point, rank the receiving transmission points based on the measured uplink signals, and select the downlink transmission point based on the ranking.

In Example 3, the subject matter of Example 2 can optionally include wherein the rank is further based on a transmission metric of the transmission point.

In Example 4, the subject matter of one or any combination of Examples 2-3 can optionally include wherein the uplink signal is a sounding reference signal (SRS).

In Example 5, the subject matter of Example 4 can optionally include wherein the SRS is transmitted, by the UE, at a higher power than SRS transmission power for physical uplink shared channel (PUSCH) link adaption.

In Example 6, the subject matter of one or any combination of Examples 1-5 can optionally include wherein the TPSM is a part of an eNB, wherein the eNB is configured as a 3GPP LTE Advanced eNB, and wherein the system is a coordinated multi-point (CoMP) remote radio head (RRH) scenario 4 system.

In Example 7, the subject matter of one or any combination of Examples 1-6 can optionally include wherein at least one of the transmission points includes a plurality of antennas and is configured to communicate with the UE using a multiple-input and multiple-output (MIMO) radio channel.

In Example 8, the subject matter of one or any combination of Examples 1-7 can optionally include wherein the UE signal includes a CSI-RS index including one or more slots, wherein each slot of the CSI-RS index corresponds with a single CSI-RS pattern and includes CSI-RS measurements derived from the single CSI-RS pattern, wherein each of the transmission points uniquely corresponds to a CSI-RS pattern, wherein to select the downlink transmission points based on the UE signal includes the TPSM further configured to select the downlink transmission point based on the CSI-RS index, and wherein the instructions configured to cause the UE to report channel state information reference signal (CSI-RS) measurements for the selected downlink transmission point include instructions to map CSI-RS patterns to slots in the CSI-RS index.

In Example 9, the subject matter of Example 8 can optionally include wherein the UE signal further includes a channel quality indicator (CQI) corresponding to a CSI-RS pattern selected by the UE to maximize a communication performance metric, the CQI correlated to the CSI-RS pattern via the CSI-RS index, and wherein to select the downlink transmission point includes selecting a transmission point corresponding to the CQI.

In Example 10, the subject matter of Example 9 can optionally include wherein each of the transmission points correspond to one of a plurality of layers, wherein a layer in the plurality of layers corresponds to a transmission range; and the TPSM is further configured to configure the UE to bias CSI-RS pattern selection based on a layer corresponding to the CSI-RS pattern's transmission point.

In Example 11, the subject matter of one or any combination of Examples 8-10 can optionally include wherein the CSI-RS measurements include reference signal received power and reference signal received quality (RSRP/RSRQ) measurements, wherein the RSRP/RSRQ measurements are relative to the UE; and
wherein to select the downlink transmission point based on the CSI-RS index includes the TPSM configured to rank the transmission points based on the RSRP/RSRP measurements and select the downlink transmission point based on the ranking.

In Example 12, the subject matter of one or any combination of Examples 8-11 can optionally include wherein to rank the transmission points based on the RSRP/RSRQ measurements includes the TPSM further configured to favorably weight the rank of a current downlink transmission point based on a transition threshold.

In Example 13, the subject matter of one or any combination of Examples 8-12 can optionally include wherein the CSI-RS index includes fewer slots than UE observable transmission points, and wherein the instructions to map CSI-RS patterns to slots in the CSI-RS index include instructions to map CSI-RS patterns to a slot of the CSI-RS index according to a sequence, wherein the sequence advances after a predetermined period.

Example 14 can include, or can optionally be combined with the subject matter of one or any combination of Examples 1-13 to include, subject matter (such as a method, means for performing acts, or a machine readable medium including instructions that, when performed by the machine cause the machine to perform acts) comprising receiving, at a transmission point selection module (TPSM) from a user equipment device (UE), a UE signal via a transmission point, wherein the transmission point is one of a plurality of transmission points sharing a single cell identification (ID), selecting a downlink transmission point from the transmission points based on the UE signal, and configuring the UE to report channel state information reference signal (CSI-RS) measurements for the selected downlink transmission point.

In Example 15, the subject matter of Example 14 can optionally include wherein the UE signal is an uplink signal, and wherein selecting the downlink transmission point based on the UE signal includes measuring the uplink signal at each receiving transmission point, ranking the receiving transmission points based on the measured uplink signals, and selecting the downlink transmission point based on the ranking.

In Example 16, the subject matter of Example 15 can optionally include wherein the ranking is further based on a transmission metric of the transmission point.

In Example 17, the subject matter of one or any combination of Examples 15-16 can optionally include wherein the uplink signal is a sounding reference signal (SRS).

In Example 18, the subject matter of Example 17 can optionally include further comprising transmitting, by the UE, the SRS at a higher power than SRS transmission power for physical uplink shared channel (PUSCH) link adaption.

In Example 19, the subject matter of one or any combination of Examples 14-18 can optionally include wherein the TPSM is part of an eNB, wherein the eNB is configured as a 3GPP LTE Advanced eNB, and wherein the eNB and the plurality of transmission points comprise a coordinated multi-point (CoMP) remote radio head (RRH) scenario 4 system.

In Example 20, the subject matter of one or any combination of Examples 14-19 can optionally include wherein at least one of the transmission points includes a plurality of antennas and is configured to communicate with the UE using a multiple-input and multiple-output (MIMO) radio channel.

In Example 21, the subject matter of one or any combination of Examples 14-20 can optionally include wherein the UE signal includes a CSI-RS index including one or more slots, wherein each of the plurality of transmission points uniquely corresponds to a CSI-RS pattern, wherein selecting the downlink transmission points based on the UE signal includes selecting the downlink transmission point based on the CSI-RS index, and wherein configuring the UE to report channel state information reference signal (CSI-RS) measurements for the selected downlink transmission point includes mapping CSI-RS patterns to slots in the CSI-RS index.

In Example 22, the subject matter of Example 21 can optionally include wherein the UE signal further includes a channel quality indicator (CQI) corresponding to a CSI-RS pattern selected by the UE to maximize a communication performance metric, the CQI correlated to the CSI-RS pattern via the CSI-RS index, and wherein selecting the downlink transmission point includes selecting a transmission point corresponding to one of the CSI-RS patterns.

In Example 23, the subject matter of Example 22 can optionally include wherein each of the plurality of transmission points correspond to one of a plurality of layers, wherein a layer in the plurality of layers corresponds to a transmission range, and wherein configuring the UE to report channel state information reference signal (CSI-RS) measurements for the selected downlink transmission point includes configuring the UE to bias CSI-RS pattern selection based on a layer corresponding to the CSI-RS pattern's transmission point.

In Example 24, the subject matter of one or any combination of Examples 21-23 can optionally include wherein the CSI-RS measurements include reference signal received power and reference signal received quality (RSRP/RSRQ) measurements, wherein the RSRP/RSRQ measurements are relative to the UE, and wherein selecting the downlink transmission point based on the CSI-RS index includes ranking the transmission points based on the RSRP/RSRP measurements, and selecting the downlink transmission point based on the ranking.

In Example 25, the subject matter of one or any combination of Examples 21-24 can optionally include wherein ranking the transmission points based on the RSRP/RSRQ measurements includes favorably weighting the rank of a current downlink transmission point based on a transition threshold.

In Example 26, the subject matter of one or any combination of Examples 21-25 can optionally include wherein the CSI-RS index includes fewer slots than UE observable transmission points, and wherein mapping CSI-RS patterns to slots in the CSI-RS index includes mapping CSI-RS patterns to a slot of the CSI-RS index according to a sequence, wherein the sequence advances after a predetermined period.

Example 27 can include, or can optionally be combined with the subject matter of one or any combination of Examples 1-26 to include, subject matter (such as a method, means for performing acts, or a machine readable medium including instruction that, when performed by the machine cause the machine to perform acts) comprising receiving, at a transmission point selection module (TPSM) from a user equipment device (UE), a UE signal via a transmission point, wherein the transmission point is one of a plurality of transmission points sharing a single cell identification (ID), selecting a downlink transmission point from the transmission points based on the UE signal, and configuring the UE to report channel state information reference signal (CSI-RS) measurements for the selected downlink transmission point.

In Example 28, the subject matter of Example 27 can optionally include wherein configuring the UE to report CSI for the selected downlink transmission point includes configuring a CSI-RS index using remote radio control (RRC), and wherein the CSI-RS index includes one or more slots, each slot mapped to a CSI-RS pattern and including CSI-RS measurements derived from the CSI-RS pattern, each transmission point of the plurality of transmission points uniquely corresponding to a CSI-RS pattern, the CSI-RS index having fewer slots than observable CSI-RS patterns.

In Example 29, the subject matter of Example 28 can optionally include wherein configuring the CSI-RS index includes remapping the one or more slots to candidate CSI-RS patterns in response to selecting a downlink transmission point different from a current downlink transmission point of the UE, the candidate CSI-RS patterns corresponding to likely transmission points from the plurality of transmission points based on the downlink transmission point.

In Example 30, the subject matter of one or any combination of Examples 28-29 can optionally include wherein the CSI-RS index is carried on the eleventh quadrature phase-shift keying (QPSK) symbol according to a 3GPP LTE-A family of standards physical uplink control channel (PUCCH) 2b.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A wireless infrastructure component comprising:
    a transmission point selection module (TPSM) configured to:
        receive, from a user equipment device (UE), a UE signal via one or more of the transmission points, wherein each slot of a channel state information reference signal (CSI-RS) index in the UE signal corresponds to a single CSI-RS pattern and includes CSI-RS measurements derived from the single CSI-RS pattern, wherein each of the transmission points uniquely corresponds to a CSI-RS pattern; and
        select a downlink transmission point from the transmission points based on the CSI-RS index in the UE signal;
    a configuration module configured to communicate instructions to the UE, the instructions configured to cause the UE to report CSI-RS measurements for the selected downlink transmission point, including instructions to map CSI-RS patterns to slots in the CSI-RS index; and
    wherein the transmission points share a single cell identification (ID) and each transmission point comprises at least one radio transceiver.

2. The wireless infrastructure component of claim 1, wherein the UE signal is an uplink signal; and
    wherein to select the downlink transmission point based on the UE signal includes the TPSM further configured to:
    measure the uplink signal at each receiving transmission point to create uplink signal measurements;
    rank the receiving transmission points based on the uplink signal measurements; and
    select the downlink transmission point based on the ranking.

3. The wireless infrastructure component of claim 2, wherein the rank is further based on a transmission metric of the transmission point.

4. The wireless infrastructure component of claim 2, wherein the uplink signal is a sounding reference signal (SRS).

5. The wireless infrastructure component of claim 4, wherein the SRS is transmitted, by the UE, at a higher power than SRS transmission power for physical uplink shared channel (PUSCH) link adaption.

6. The wireless infrastructure component of claim 1, wherein the wireless infrastructure component is an eNB according to a 3GPP Long Term Evolution Advanced (LTE-A) family of standards.

7. The wireless infrastructure component of claim 1, wherein at least one of the transmission points includes a plurality of antennas and is configured to communicate with the UE using a multiple-input and multiple-output (MIMO) radio channel.

8. The wireless infrastructure component of claim 1, wherein the UE signal further includes a channel quality indicator (CQI) corresponding to a CSI-RS pattern selected by the UE to maximize a communication performance metric, the CQI correlated to the CSI-RS pattern via the CSI-RS index; and
    wherein to select the downlink transmission point includes selecting a transmission point corresponding to the CQI.

9. The wireless infrastructure component of claim 8, wherein each of the transmission points correspond to one of a plurality of layers, wherein a layer in the plurality of layers corresponds to a transmission range; and the TPSM is further configured to configure the UE to bias CSI-RS pattern selection based on a layer corresponding to the CSI-RS pattern's transmission point.

10. The wireless infrastructure component of claim 1, wherein the CSI-RS measurements include reference signal received power and reference signal received quality (RSRP/RSRQ) measurements, wherein the RSRP/RSRQ measurements are relative to the UE; and
wherein to select the downlink transmission point based on the CSI-RS index includes the TPSM configured to:
rank the transmission points based on the RSRP/RSRP measurements; and
select the downlink transmission point based on the ranking.

11. The wireless infrastructure component of claim 10, wherein to rank the transmission points based on the RSRP/RSRQ measurements includes the TPSM further configured to favorably weight the rank of a current downlink transmission point based on a transition threshold.

12. The wireless infrastructure component of claim 1, wherein the CSI-RS index includes fewer slots than UE observable transmission points; and
wherein the instructions to map CSI-RS patterns to slots in the CSI-RS index include instructions to map CSI-RS patterns to a slot of the CSI-RS index according to a sequence, wherein the sequence advances after a predetermined period.

13. A method comprising:
receiving, at a transmission point selection module (TPSM) of the wireless infrastructure component from a user equipment device (UE), a UE signal via one or more transmission points, wherein the one or more transmission points are in a plurality of transmission points sharing a single cell identification (ID), wherein each slot of a channel state information reference signal (CSI-RS) index in the UE signal corresponds to a single CSI-RS pattern and includes CSI-RS measurements derived from the single CSI-RS pattern, wherein each of the transmission points uniquely corresponds to a CSI-RS pattern;
selecting a downlink transmission point from the transmission points based on the CSI-RS index in the UE signal; and
configuring the UE to report CSI-RS measurements for the selected downlink transmission point by sending instructions to the UE to map CSI-RS patterns to slots in the CSI-RS index.

14. The method of claim 13, wherein the UE signal is an uplink signal; and wherein selecting the downlink transmission point based on the UE signal includes:
measuring the uplink signal at each receiving transmission point to create uplink signal measurements;
ranking the receiving transmission points based on the uplink signal measurements; and
selecting the downlink transmission point based on the ranking.

15. The method of claim 14, wherein the uplink signal is a sounding reference signal (SRS); and
the method further comprising transmitting, by the UE, the SRS at a higher power than SRS transmission power for physical uplink shared channel (PUSCH) link adaption.

16. The method of claim 13, wherein the wireless infrastructure component is an eNB according to a 3GPP Long Term Evolution Advanced (LTE-A) family of standards.

17. The method of claim 13, wherein the UE signal further includes a channel quality indicator (CQI) corresponding to a CSI-RS pattern selected by the UE to maximize a communication performance metric, the CQI correlated to the CSI-RS pattern via the CSI-RS index; and
wherein selecting the downlink transmission point includes selecting a transmission point corresponding to the CSI-RS pattern.

18. The method of claim 13, wherein the CSI-RS measurements include reference signal received power and reference signal received quality (RSRP/RSRQ) measurements, wherein the RSRP/RSRQ measurements are relative to the UE; and
wherein selecting the downlink transmission point based on the CSI-RS index includes:
ranking the transmission points based on the RSRP/RSRP measurements, including favorably weighting the rank of a current downlink transmission point based on a transition threshold; and
selecting the downlink transmission point based on the ranking.

19. The method of claim 13, wherein the CSI-RS index includes fewer slots than UE observable transmission points; and
wherein mapping CSI-RS patterns to slots in the CSI-RS index includes mapping CSI-RS patterns to a slot of the CSI-RS index according to a sequence, wherein the sequence advances after a predetermined period.

20. A non-transitory machine readable medium including instructions that, when executed by a machine, cause the machine to perform operations comprising:
receiving, at a transmission point selection module (TPSM) from a user equipment device (UE), a UE signal via one or more transmission points, wherein the one or more transmission points are in a plurality of transmission points sharing a single cell identification (ID), wherein each slot of a channel state information reference signal (CSI-RS) index in the UE signal corresponds to a single CSI-RS pattern and includes CSI-RS measurements derived from the single CSI-RS pattern, wherein each of the transmission points uniquely corresponds to a CSI-RS pattern;
selecting a downlink transmission point from the transmission points based on the CSI-RS index in the UE signal; and
configuring the UE to report CSI-RS measurements for the selected downlink transmission point by sending instructions to the UE to map CSI-RS patterns to slots in the CSI-RS index.

21. The machine readable medium of claim 20, wherein configuring the UE to report CSI for the selected downlink transmission point includes configuring a CSI-RS index using remote radio control (RRC); and
wherein the CSI-RS index includes one or more slots, the CSI-RS index having fewer slots than observable CSI-RS patterns.

22. The machine readable medium of claim 20, wherein configuring the CSI-RS index includes remapping the one or more slots to candidate CSI-RS patterns in response to selecting a downlink transmission point different from a current downlink transmission point of the UE, the candidate CSI-RS patterns corresponding to likely transmission points from the plurality of transmission points based on the downlink transmission point.

23. The machine readable medium of claim 20, wherein the CSI-RS index is carried on the eleventh quadrature phase-shift keying (QPSK) symbol according to a 3GPP Long Term Evolution Advanced (LTE-A) family of standards uplink control channel (PUCCH) 2b.

* * * * *